(12) United States Patent
Löfgren

(10) Patent No.: US 12,321,415 B2
(45) Date of Patent: Jun. 3, 2025

(54) METHOD AND DEVICE FOR OBJECT TRACKING

(71) Applicant: SAAB AB, Linköping (SE)

(72) Inventor: Torbjörn Löfgren, Uppsala (SE)

(73) Assignee: SAAB AB, Linköping (SE)

( * ) Notice: Subject to any disclaimer, the term of this patent is extended or adjusted under 35 U.S.C. 154(b) by 288 days.

(21) Appl. No.: 17/835,343

(22) Filed: Jun. 8, 2022

(65) Prior Publication Data

US 2022/0398294 A1      Dec. 15, 2022

(51) Int. Cl.
*G06F 17/13* (2006.01)

(52) U.S. Cl.
CPC .................. *G06F 17/13* (2013.01)

(58) Field of Classification Search
CPC ...... G06F 17/13; G06F 17/18; G06F 2218/00; G06T 2207/30241; G06T 7/207; G06T 7/277; G06T 7/20; B60R 1/20
See application file for complete search history.

(56) References Cited

U.S. PATENT DOCUMENTS

| | | | |
|---|---|---|---|
| 5,537,118 A | 7/1996 | Appriou | |
| 2003/0228032 A1* | 12/2003 | Rui | G06V 10/245 382/103 |
| 2011/0270592 A1 | 11/2011 | Kalender et al. | |
| 2014/0324339 A1* | 10/2014 | Adam | G01S 13/726 701/519 |
| 2015/0281655 A1 | 10/2015 | Turetken et al. | |
| 2015/0363940 A1* | 12/2015 | Held | G06T 7/207 382/107 |
| 2016/0161606 A1 | 6/2016 | Turner et al. | |
| 2017/0301109 A1 | 10/2017 | Chan et al. | |
| 2019/0035088 A1 | 1/2019 | Legrand | |
| 2019/0066313 A1* | 2/2019 | Kim | G06V 10/255 |
| 2020/0174481 A1 | 6/2020 | Van Heukelom et al. | |

(Continued)

FOREIGN PATENT DOCUMENTS

| | | |
|---|---|---|
| GB | 2564146 A | 1/2019 |
| WO | 2012/166757 A2 | 12/2012 |
| WO | 2019083978 A1 | 5/2019 |

OTHER PUBLICATIONS

Office Action mailed Feb. 11, 2022 for Swedish Patent Application No. 2100097-1, 12 pages.

(Continued)

*Primary Examiner* — Mohamed Charioui
(74) *Attorney, Agent, or Firm* — Sage Patent Group

(57) ABSTRACT

The present disclosure relates to a computer-implemented method for object tracking, the method including the steps of defining a state-space of interest based on a class of objects subject to tracking. Further, the method includes the step of representing the state-space of interest using a FEM representation partitioning the state-space of interest in elements. Further, the method includes initiating a state-space distribution defining a probability density for different states of at least one tracked object in the state-space of interest. Moreover, the method updates the state-space distribution based on evidence, wherein the evidence being at least one of sensor data and external data of at least one tracked object in said class of objects. Furthermore, the method propagates the state-space distribution of the at least one tracked object for a time period.

11 Claims, 9 Drawing Sheets

(56) References Cited

U.S. PATENT DOCUMENTS

2020/0354079 A1   11/2020  Chan et al.
2020/0409375 A1*  12/2020  Bowe .................... G06F 16/29

OTHER PUBLICATIONS

Extended European Search Report mailed Dec. 13, 2022 for European Patent Application No. 22177237.9, 10 pages.
Qian, Gang et al.; "Fusion of Nonlinear Motion Dynamics Using Fokker-Planck Equation and Projection Filter"; 17th International Conference on Information Fusion, International Society Society of Information Fusion; Jul. 7, 2012; 7 pages.
Pedersen, M.W. et al.; "Nonlinear Tracking in a Diffusion Process with a Bayesian Filter and the Finite Element Method"; Computational Statistics and Data Analysis, vol. 55, No. 1; 2011; pp. 280-290 (11 pages).
Aughenbaugh, J. M. et al.; "A Polynomial-Adaptive Scheme for Bayesian Tracking"; 14th International Conference on Information Fusion; Jul. 5-8, 2011; Chicago, IL; pp. 1115-1122, 8 pages.
De, A. et al.; "Convergence of Bayesian Histogram Filters for Location Estimation"; 52nd IEEE Conference on Decision and Control, Dec. 2013, pp. 7047-7053, 3 pages (Abstract only).
Wuhrer, S. et al.; "Finite Element Based Tracking of Deforming Surfaces"; Graphical Models vol. 77; 2015; pp. 1-17; 19 pages.

* cited by examiner

METHOD AND DEVICE FOR OBJECT TRACKING

CROSS-REFERENCE TO RELATED APPLICATIONS

The present application for patent claims priority to Sweden Patent Office Application Ser. No. 2100097-1, entitled "METHOD AND DEVICE FOR OBJECT TRACKING" filed on Jun. 9, 2021, assigned to the assignee hereof, and expressly incorporated herein by reference.

TECHNICAL FIELD

The present disclosure relates to a method, computer readable storage medium, vehicle and a device for object tracking.

BACKGROUND

In recent years, there is a rapidly growing importance in surveillance, which has made it a necessary area of research. Specifically, object tracking is an important topic which is of high importance. There exist several techniques for tracking objects of interest and object tracking has numerous applications such as in traffic control, human computer interaction, forensics, augmented reality and visual surveillance.

In Bayesian tracking schemes, the state space is a central concept. The state-space is used to describe the statistical properties of a system. The state space itself is not a statistical concept. It is a description of a system, e.g. a dynamic system.

The probability density function in the state space is often modeled as a Gaussian (in e.g. Kalman filters) even if deeper analysis do not support that the true distribution is Gaussian. Fundamental, and often very large, errors are therefore imposed by a derived erroneous model. Freer modeling using "particle filters" have been in use (to reduce such problems) for navigation applications. Modelling errors might get lower but there are server problems in particle methods to handle large areas of low probability density (covering a non-negligible fraction of the probability mass). Particle methods further have difficulties to apply dynamic changes in the resolution of state-spaces, i.e. to shift areas of interest as there is no built in interconnection between the nodes. Further, such models struggle to accurately define state-spaces needing 3D handling e.g. altitude maps.

Thus, there is room in the present art to explore the domain of providing a method for object tracking and a device for object tracking that minimizes errors, accurately defines state space, and can apply changes and adaptations in resolutions of state-space distributions. Accordingly, there is room for improvements in the art to provide means for methods and devices with improved object tracking.

Even though some currently known solutions work well in some situations it would be desirable to provide a method and device that fulfill requirements related to improving object tracking to obtain an improved object tracking. More specifically it would be desirable to provide a method and device that improves the accuracy of state-space modelling in object tracking and that can reduce errors and apply changes/adaptations in resolution in a modelled state-space during object tracking.

SUMMARY

It is therefore an object of the present disclosure to provide methods and devices for object tracking to mitigate, alleviate or eliminate one or more of the above-identified deficiencies and disadvantages.

This object is achieved by means of a method, device, a computer readable storage medium and a vehicle as defined in the appended claims 1, 9, 10, 11.

The present disclosure is at least partly based on the insight that by providing an improved method and device that improves the accuracy of state-space modelling in object tracking at least the errors will be vastly reduced and accuracy in tracking will be improved.

The present disclosure provides a computer-implemented method for object tracking, the method comprises the steps of, defining a state-space of interest based on a class of objects subject to tracking. Further, representing the state-space of interest using a finite element model (FEM) representation partitioning the state-space of interest in elements. Moreover, a state-space distribution is initiated that defines a probability density for different states of at least one tracked object in the state-space of interest. Furthermore, the state-space distribution is updated based on evidence, wherein the evidence is at least one of sensor data and external data of at least one tracked object in said class of objects. Moreover, the method propagates the state-space distribution of the at least one tracked object for a time period.

An advantage of the method is that it allows for, by application of FEM, partitioning the state-space in a manner which is not limited to regular elements, instead the state space can be expressed without restrictions. In other words, the complexity of the state-space of interest is not a limitation and utilizing FEM allows for a high degree of freedom when implemented in object tracking.

Further, the probability density represented in the FEM model allows for a tracking procedure to be more accurate and can also reduce modelling errors. The step of propagating allows for the method to determine the state of the object subject to tracking for a future time period. In other words, the method is continuously determining probability density of states of at least one tracked object.

The method may further comprise the step of re-building the FEM representation, wherein the re-built FEM-representation adjusts a state-space resolution of said state-space of interest for each of the at least one objects.

The method may adjust the state-space resolution so that the resolution is optimized for different regions in different parts of the FEM representation. Accordingly, processing power of a device performing the method may be utilized in the most efficient manner. Further, the FEM model may provide for higher/lower resolution in parts of higher/lower interest in the state-space distribution.

The states are at least one of the position of the at least one object, the velocity of the at least one object, or the position and the velocity of the at least one object.

The state-space of interest represents all possible states of the at least one tracked object.

A benefit of this is that all possible states of the at least one object is represented and defined in the probability density allowing for an accurate tracking procedure.

The method may further comprise the step of prioritizing a state-space resolution of the state-space distribution, wherein prioritizing comprises modifying the resolution for at least one of a part of said state-space of interest and a selection of the at least one tracked objects.

Thus, the state-space resolution may be prioritized in order to emphasise or understate different parts of the state-space of interest or different tracked objects. The prioritization may be pre-configured in a device performing the method in order to autonomously emphasize/understate objects/parts in state-space distribution. In some embodiments, the prioritization may be performed in real-time. In other words, the method provides the benefit of allowing to selectively prioritize state-space resolution which can lead to an adjustable and adaptable tracking process.

The method may comprise the step of transmitting the state-space distribution to a remote entity.

The class of objects is classified based on a mobility of objects. The mobility of objects may be on-ground mobility, in-air mobility, on sea-mobility or any combination thereof. Accordingly, the tracking process may be further optimized by focusing on specific classes of objects which allows for the method to optimize the resolution of the state-space of interest to identify such objects.

The step of propagating comprises time-integrating states of the at least one object in said state-space of interest for a time period. Accordingly, the step of propagating may time integrate e.g. a tracked object from at least one point in time and update the FEM-model to represent the state of the object in a later point in time. Providing continuous tracking of objects. Thus, the propagation is time-integrated from a given time period to another time period.

There is further provided an electronic device for object tracking comprising control circuitry, a memory device, an input interface, at least one output interface, wherein the control circuitry is configured to execute instruction sets stored in the memory device to define a state-space of interest based on a class of objects subject to tracking. The state space of interest may be defined by sensors of the electronic device or other devices that are transmitted to the electronic device. Further, the method comprises the step of representing the state-space of interest using a finite element model (FEM) representation partitioning the state-space of interest in elements. Further, the method initiates a state-space distribution defining a probability density for different states of at least one tracked object in the state-space of interest. Further, the method updates the state-space distribution based on evidence, wherein the evidence being at least one of sensor data and external data of at least one tracked object in said class of objects. Moreover, the method propagates the state-space distribution of the at least one tracked object for a time period.

There is further provided a computer readable storage medium storing one or more programs configured to be executed by one or more control circuitry of an electronic device, the one or more programs comprising instructions for performing the method according to the method herein.

There is further provided a vehicle comprising the electronic device according to the present disclosure, the vehicle may be a ground-vehicle, an airborne vehicle or a ship.

BRIEF DESCRIPTION OF THE DRAWINGS

In the following, the disclosure will be described in a non-limiting way and in more detail with reference to exemplary embodiments illustrated in the enclosed drawings, in which.

DETAILED DESCRIPTION

In the following detailed description, some embodiments of the present disclosure will be described. However, it is to be understood that features of the different embodiments are exchangeable between the embodiments and may be combined in different ways, unless anything else is specifically indicated. Even though in the following description, numerous specific details are set forth to provide a more thorough understanding of the provided method, devices and vehicles, it will be apparent to one skilled in the art that the method, devices and vehicles may be realized without these details. In other instances, well known constructions or functions are not described in detail, so as not to obscure the present disclosure.

The term "finite element model (FEM)" may refer to a numerical model representing a state-space subdivided/partitioned into elements where basis functions of suitable degree are associated to the partitioning. The assignment of basis-functions enables defined functions of selected regularity for all possible states in a state-space, not only at the specific discrete combinations expressed by the nodes. Knowledge of the distribution in all points is central for statistical inference, i.e. transfer of densities to integrated statements related to probability and is achieved by the method in accordance with the present disclosure.

The term "probability density" or "probability density function" refers to a probability per unit measure in a neighbourhood to a state space value i.e. a state-space value within a state-space of interest. In the present disclosure the probability density may be defined for all possible states of at least one object in a state-space of interest.

The term "state-space of interest" may within the present disclosure refer to an area/domain of interest subject to object tracking.

Figure 1:
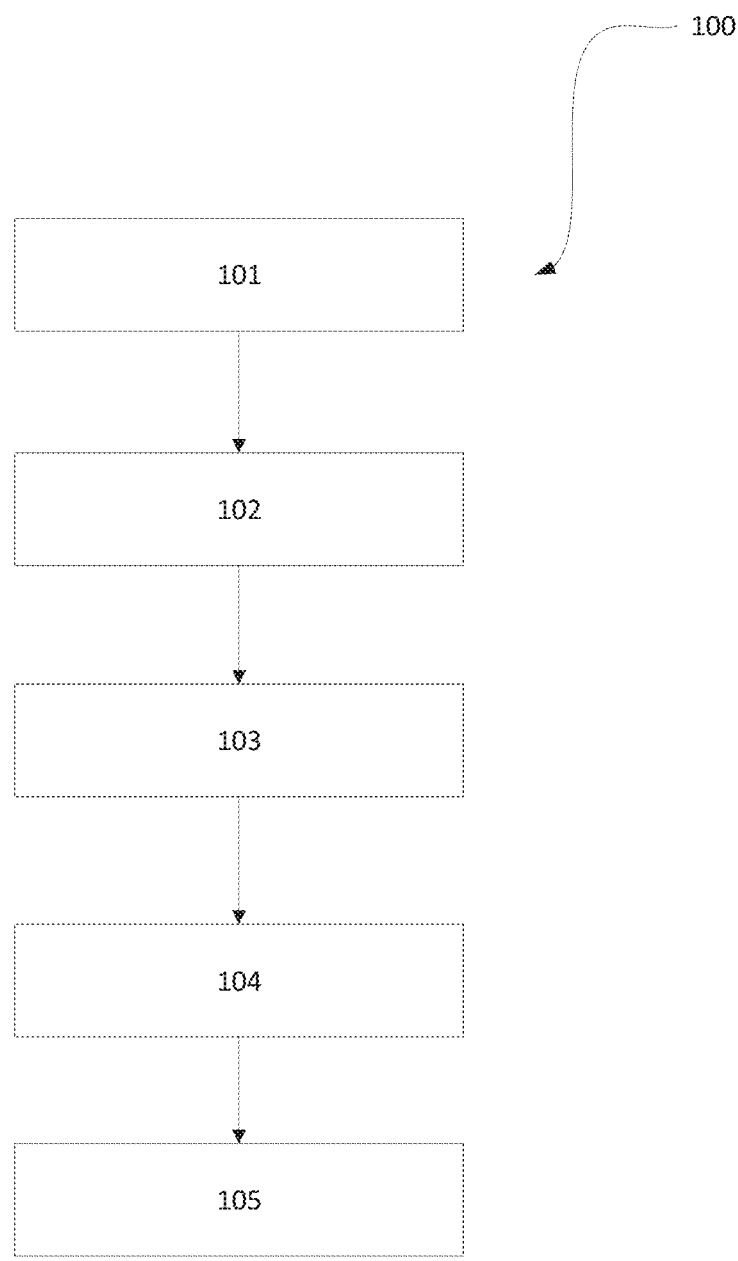
FIG. 1 illustrates a flowchart of a method for tracking objects in accordance with an embodiment of the present disclosure.

FIG. 1 illustrates a flowchart of a computer-implemented method 100 for tracking objects. The method 100 comprises the steps of, defining 101 a state-space of interest based on a class of objects subject to tracking. Further, representing 102 the state-space of interest using a finite element model (FEM) representation partitioning the state-space of interest in elements. Moreover, a state-space distribution is initiated 103 that defines a probability density for different states of at least one tracked object in the state-space of interest. Furthermore, the state-space distribution is updated 104 based on evidence, wherein the evidence is at least one of sensor data and external data (indicating a state) of at least one tracked object in said class of objects. Moreover, the method 100 propagates 105 the state-space distribution of the at least one tracked object for a time period.

For performing the method 100 according to the present disclosure, the tracking scheme may further comprise dynamic rules for the at least one tracked object, i.e. rules enabling time integration of the state space probability density. Thus, allowing the method to propagate 105 the state-space distribution.

The method is not limited to the order shown in FIG. 1, the steps 100-105 may be performed in any other suitable order.

The evidence may be any data comprising information about the state of the at least one object being tracked. Sensor data may be data obtained from e.g. a device on a vehicle that performs the object tracking. External data may be data that is transmitted to device/vehicle performing the method 100. The external data may e.g. be manually entered, or measured by a remote entity. External data may be data that allows e.g. a state space of interest to be defined.

Figure 2:
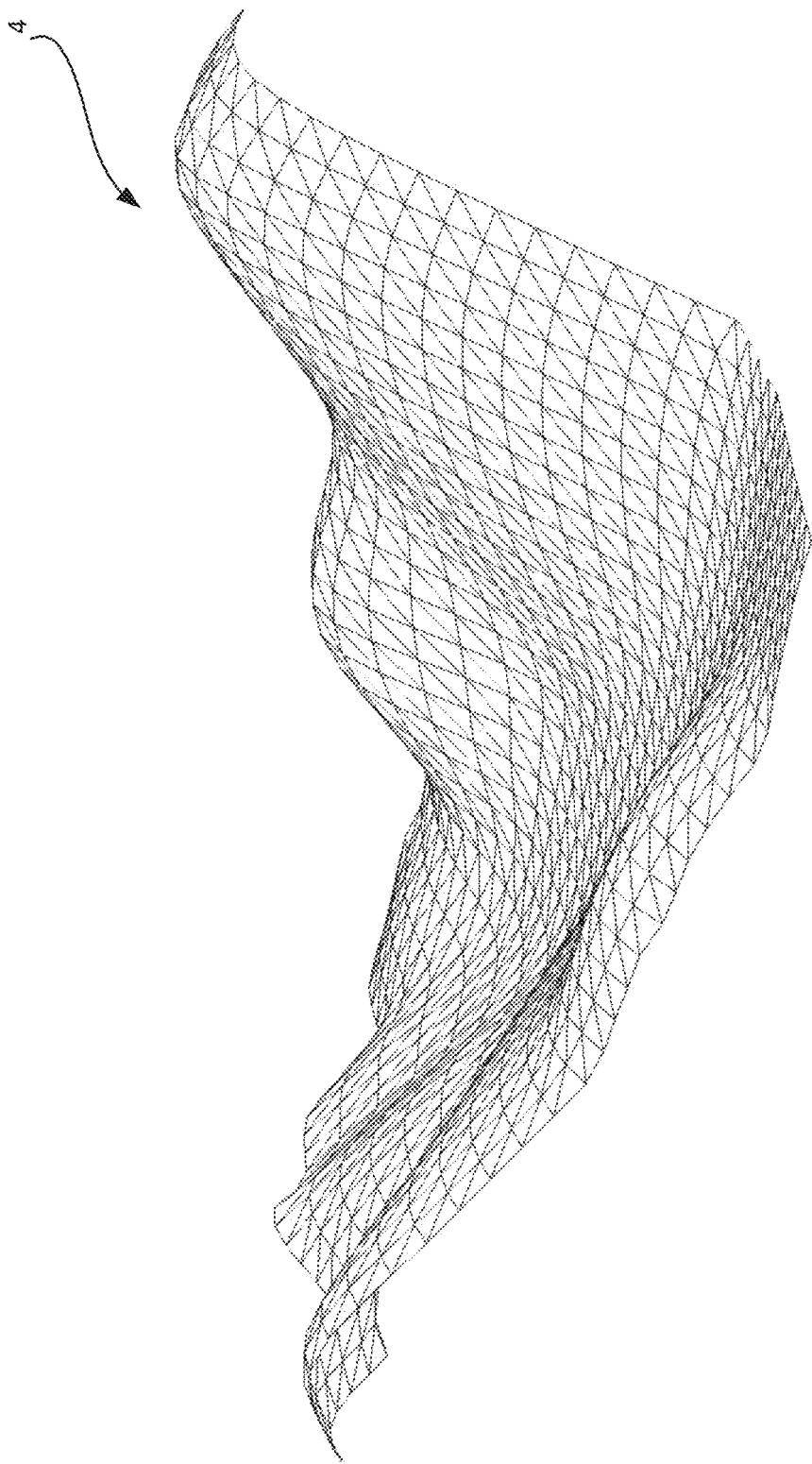
FIG. 2 illustrates an exemplary view of a state-space of interest provided in the method in accordance with an embodiment of the present disclosure.

FIG. 2 illustrates an exemplary view of a state-space of interest 4. Accordingly, in FIG. 2 the state space of interest 4 is a part of the earth surface. Further, the state-space of interest 4 shown in FIG. 2 is represented using a FEM model partitioning it in elements (as in step 102 in the method 100). The elements are not restricted to the form/shape shown in FIG. 2 as it only serves as an illustrative purpose. Thus, the elements are not restricted to a specific form/shape but may have irregularities in the mesh which may be provided by FEM. Further, the state-space of interest is not limited to a ground model it may be e.g. an air model.

Figure 3A:
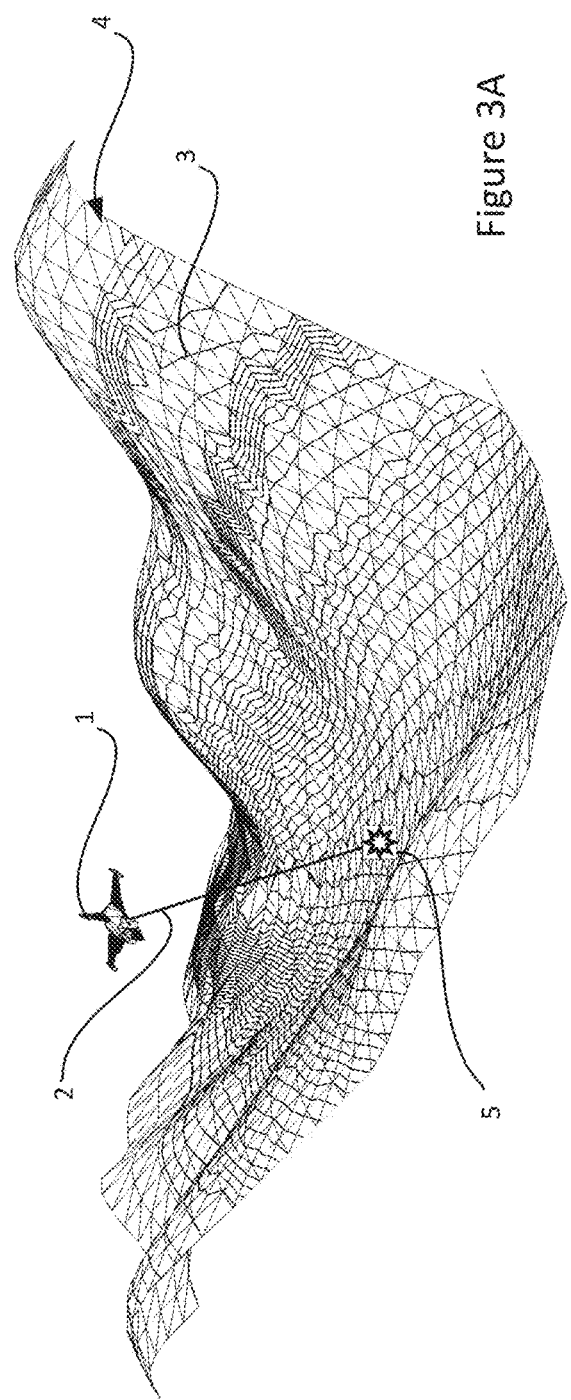
FIG. 3A illustrates an exemplary view of a state-space distribution of a tracked object in a state-space of interest provided the method in accordance with an embodiment of the present disclosure.
Figure 3B:
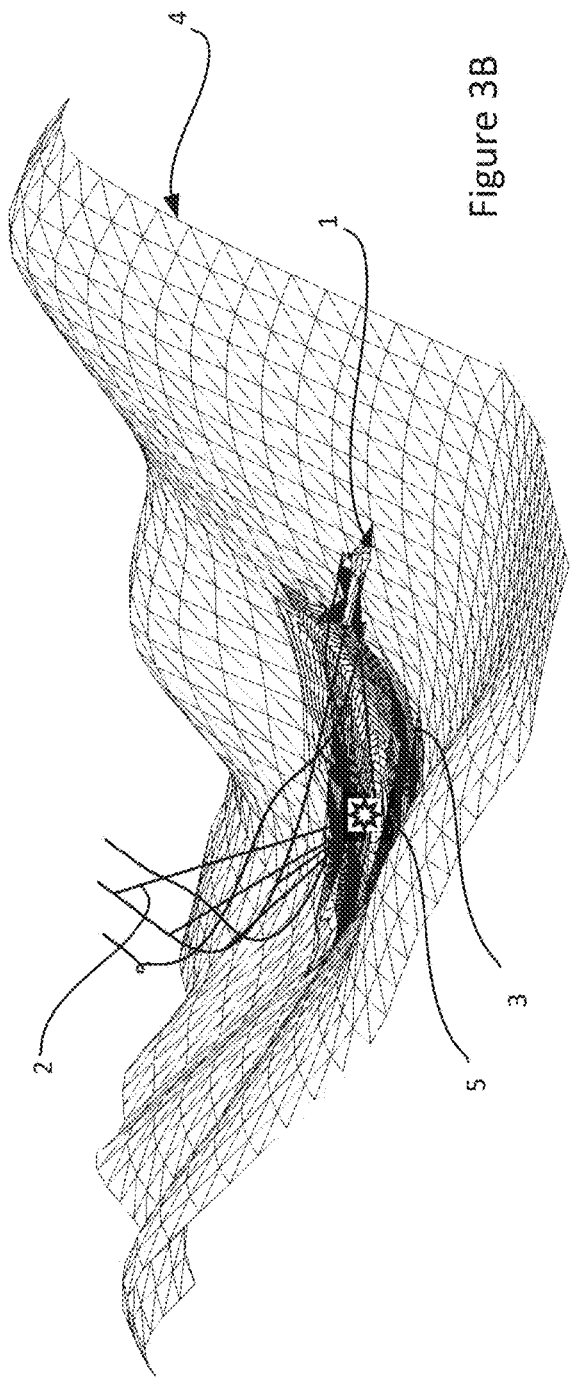
FIG. 3B illustrates an exemplary view of a state-space distribution of a tracked object in a state-space of interest provided the method in accordance with an embodiment of the present disclosure.

FIG. 3A and FIG. 3B illustrate a vehicle 1 performing the method 100 at different points in time, wherein FIG. 3B is at a point forward in time compared to FIG. 3A. FIG. 3A-3B shows a state-space distribution of a tracked object in the state-space of interest 4 shown in FIG. 2. FIGS. 3A-3B are shown in an exemplary manner and the method is not limited to such a vehicle or state space of interest 4. FIG. 3A illustrates a vehicle 1 tracking an object of interest, as seen in FIG. 3A the vehicle 1 obtains evidence 2 of the state of the object. The evidence 2 in FIG. 3A may be in the form of a measurement of an emission from an object at a true object position 5 at the end of the line 2 (distant from the vehicle). The positions limited to the surface expressed by the altitude contour is the space of allowed states in the used illustrations.

In FIG. 3A the probability density is defined in the state-space of interest 4 (i.e. a state space distribution) which in FIG. 3A is a land area. This is illustrated by the equi-probability-density-lines (EPD-lines) 3 traversing the elements/grid, representing probability density. The example state space 4 is thus defined by the geometrical texture spanning a two dimensional subset of the physical three dimensional world. Tracking of ground based items implies a restriction of the state space to a two dimensional surface.

The probability density (and also the altitude) is then defined for all points on the state-space of interest 4, not limited to the nodes or elements. The FEM representation provides continuous definition of the state space distribution over the state space 4, herein by a topographical contour. Thus, the values of the probability density is illustrated by equi-probability density lines 3. In FIG. 3A is the distribution is quite wide (compared to FIG. 3B) as it is based on a single evidence 2. The probability density is highest in the valley below the aircraft (also where the true, but not known, true object position 5 is located) and it is lower on the sides, i.e. up on the hills away from the true object position 5.

FIG. 3B shows that the vehicle 1 has obtained more evidence 2 illustrated by the vertical lines 2 from a true object position 5 relative to the vehicle 1 position at the time of validity of the evidence 2. Consequently, the probability density is shifted (compared to FIG. 3A) being higher and with faster decay (seen by more densely packed EPD lines 3) around the true object position 5.

Note that the distribution should preferably be propagated in time before inclusion of additional evidence 2. A complete tracking scheme may also contain alternative mobility hypothesis and thus possibly also alternative state-spaces. The propagation step 105 is mandatory in the sense that the validity of the already available distribution (i.e. probability density) must be shifted in time to the time of inclusion of additional evidence 2 obtained. But the step is trivial for time invariant states. The step of propagating 105 may comprise time-integrating states of the at least one object in said state-space of interest for a time period.

Figure 4:
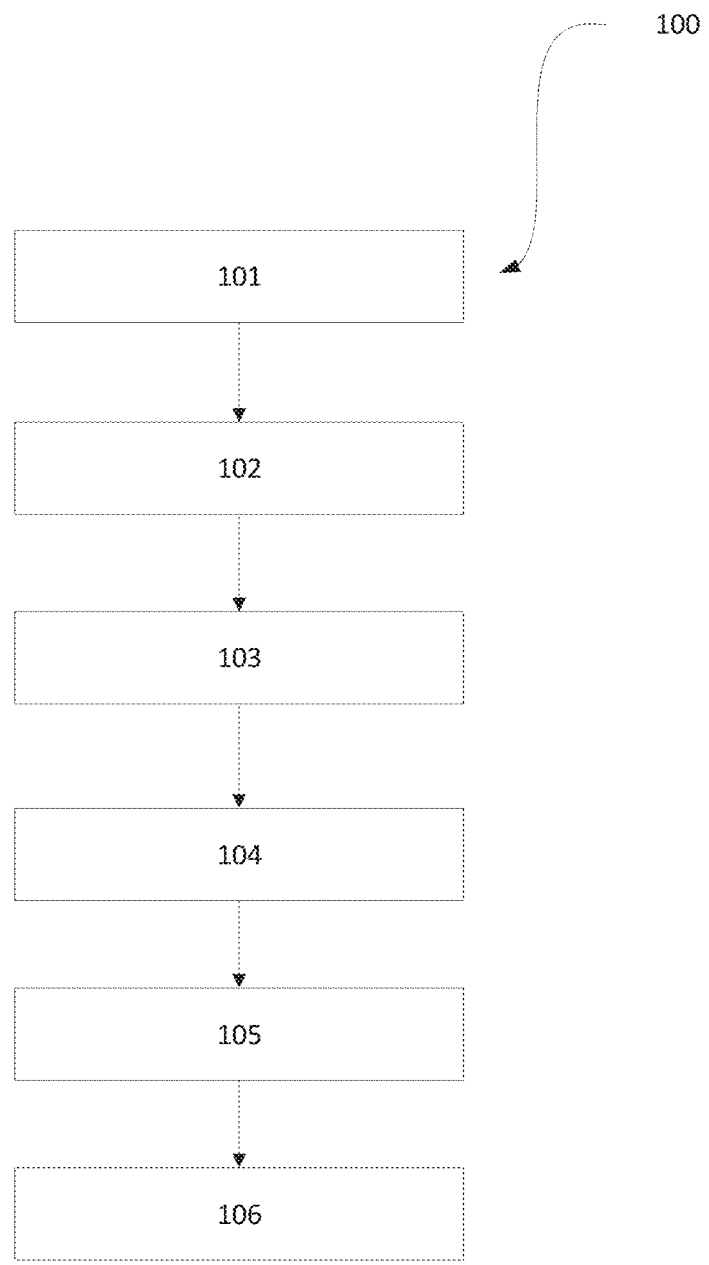
FIG. 4 illustrates a flowchart of a method for tracking objects in accordance with an embodiment of the present disclosure.

FIG. 4 illustrates a flowchart of the method 100 further comprising the step of re-building 106 the FEM representation, wherein the re-builded FEM-representation adjusts a state-space resolution of said state-space of interest for each of the at least one objects. The re-building 106 may be performed upon obtaining new sets of evidence. The rebuilding 106 may be pre-configured in the method/electronic device so to be performed at pre-determined occasions. The step of re-building 106 may comprise evaluating the resolution and based on said evaluation chose to re-build or keep an existing state-space resolution.

The states may be at least one of the position of the at least one object, the velocity of the at least one object, or the position and the velocity of the at least one object.

The state-space of interest may represent all possible states of the at least one tracked object.

As seen in FIG. 4, the method 100 may further comprise the step of prioritizing 106' a state-space resolution of the state-space distribution, wherein prioritizing comprises modifying the resolution for at least one of a part of said state-space of interest or a selection of the at least one tracked object. Modifying the resolution may refer to that e.g. state space partitioning is adjusted in size and/or form. The resolution may be modified so to be of higher resolution or lower resolution in specific areas. The method may further comprise the step of transmitting the state-space distribution to a remote entity (not shown).

Figure 5A:
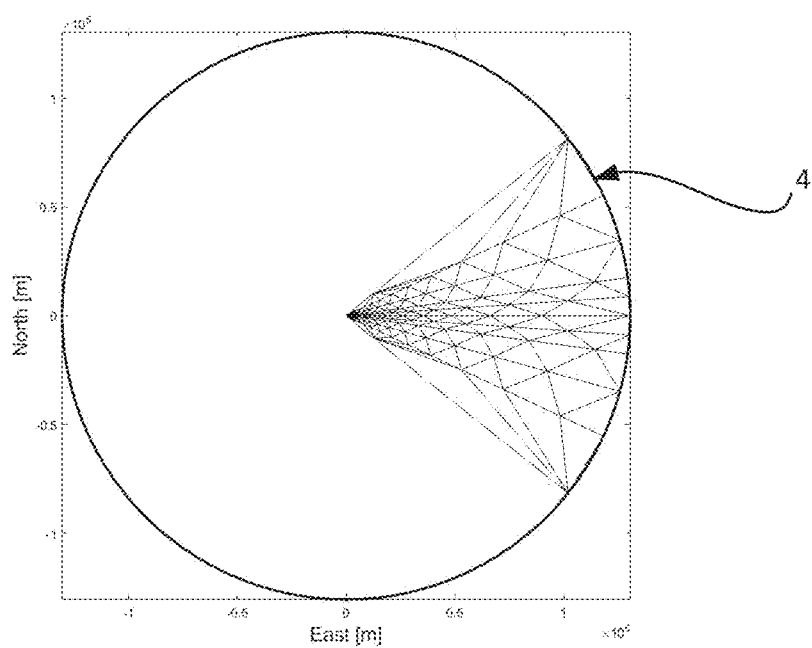
FIG. 5A illustrates an exemplary view of a state-space of interest provided in the method in accordance with an embodiment of the present disclosure.

FIG. 5A illustrates a state-space of interest 4 where the state-space resolution of said state-space of interest 4 is re-builded/prioritized in accordance with method steps 106 and 106'. As seen in FIG. 5A, the elements are not restricted to a specific form/shape but comprises irregularities in the mesh which is provided by FEM representation. Thus, the resolution is higher in some domains in the state space of interest 4 and lower in some areas in the state space of interest 4. The advantage of this is that the resolution can be directed to be of higher resolution/lower resolution based on demands. E.g. a domain having a low importance/priority in the object tracking may be represented by a low resolution. Consequently, tracking speed and accuracy is improved, and processing power of the device performing tracking is more efficiently utilized. The current example has far better resolution in the close vicinity of the origin than further out. This can be based on higher demand on resolution in close range, to a site located to the origin, than further out. It may also be a result of far better measurement performance, i.e. better support in the provided evidences, in the close range than further out. The full state space of interest is here limited by a circle illustrating the horizon. No objects or evidences for objects can be obtained beyond this circular limiting line. The state space resolution is here further omitting large sectors completely. The state space is just resolved in a small sector. This can be caused by a prioritisation of this sector. It may also be a result of (strong) evidences from polar measurement evidences that may have excluded all hypothesis in other directions.

Figure 5B:
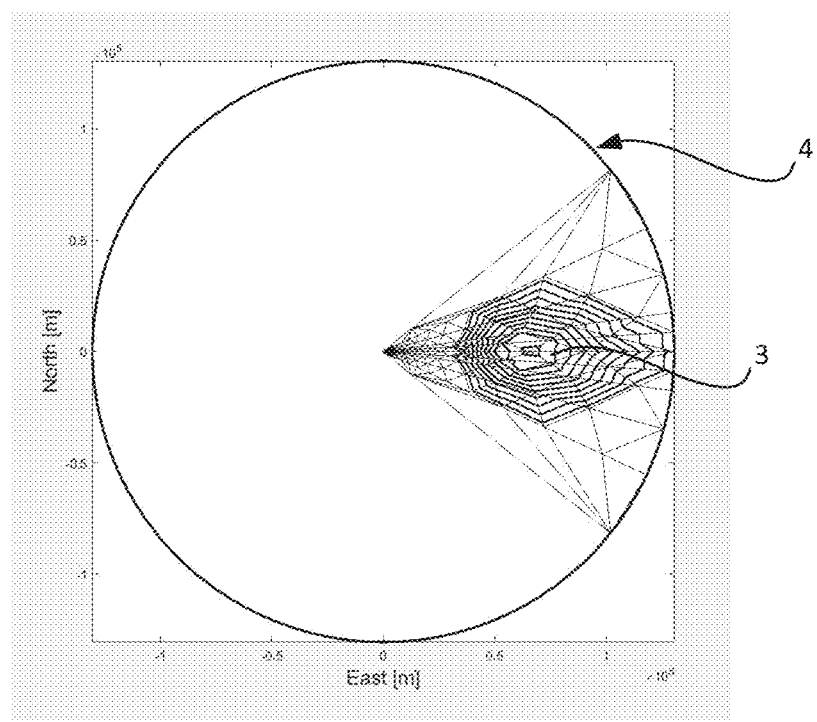
FIG. 5B illustrates an exemplary view of a state-space distribution of a tracked object in a state-space of interest provided the method in accordance with an embodiment of the present disclosure.

FIG. 5B illustrates the state-space of interest 4 (i.e. a physical area subject to tracking) shown in FIG. 5A, however showing the state-space of interest 4 after initiating 103 a state-space distribution defining a probability density for different states of at least one tracked object in the state-space of interest. Thus, the probability density is defined in said state-space of interest 4 seen by EPD-lines 3. Based on the state-space distribution in FIG. 5B, it is possible to further refine the resolution. As shown in FIG. 5B, there is a highest resolution close to the origin which is not needed based on the probability density distribution (having a higher density away from the origin of the circle—which may be associated to a higher relevance) shown in FIG. 5B. Thus, the method 100 may reduce the element sizes around the current peak and reduce the resolution close to the origin region given the current distribution in FIG. 5B. The method 100 in accordance with the present disclosure may provide regular refinements based on requests or based on pre-defined/configured conditions, so to optimize the resolution of the state-space distribution.

The class of objects may be classified based on a mobility of objects. Accordingly, a mobility of objects may be e.g. ground-borne objects, air-borne objects, fixed objects, (average or peak) velocity of objects, size of objects or any combination thereof. Thus, if the class of objects are ground-borne objects or fixed objects the state space of interest may be a ground area.

Figure 6:
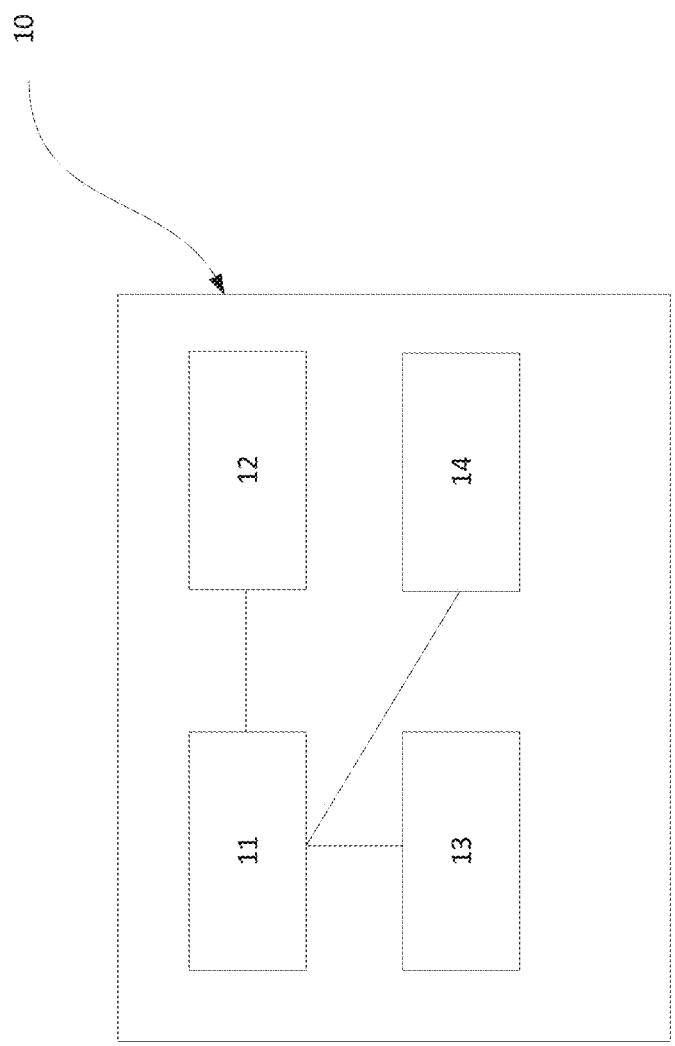
FIG. 6 schematically illustrates an electronic device for object tracking in accordance with an embodiment of the present disclosure.

FIG. 6 illustrates an electronic device 10 for object tracking, the device 10 comprising control circuitry 11, a memory device 12, an input interface 13, at least one output interface 14, wherein the control circuitry 11 is configured to execute instruction sets stored in the memory device 12 to define a state-space of interest based on a class of objects subject to tracking, representing the state-space of interest using a FEM, finite element representation partitioning the state-space of interest in elements. Further, the electronic device 10 is configured to initiate a state-space distribution defining a probability density for different states of at least one tracked object in the state-space of interest. Further, the device 10 is configured to update the state-space distribution based on evidence, wherein the evidence being at least one of sensor data and external data of at least one tracked object in said class of objects. Moreover, the device 10 is configured to propagate the state-space distribution of the at least one tracked object for a time period.

As illustrated in FIG. 6, the electronic device 10 may comprise one or more memory devices 12 and control circuitry 11. The memory device 12 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by each associated control circuitry 11. Each memory device 12 may store any suitable instructions, data or information, including a computer program, software, an application including one or more of logic, rules, code, tables, etc. and/or other instructions capable of being executed by the control circuitry 11 and, utilized. Memory device 12 may be used to store any calculations made by control circuitry 11 and/or any data received via interface 13, 14. In some embodiments, each control circuitry 11 and each memory device 12 may be considered to be integrated.

Each memory device 12 may also store data that can be retrieved, manipulated, created, or stored by the control circuitry 11. The data may include, for instance, local updates, parameters, training data, evidence, data on class of objects and other data. However, the data may be stored in a cloud computing device accessible by the electronic device 10. The data can be stored in one or more databases. The one or more databases can be connected to the electronic device 10 by a high bandwidth field area network (FAN) or wide area network (WAN), or can also be connected to electronic device 10 through a communication network.

The control circuitry 11 may include, for example, one or more central processing units (CPUs), graphics processing units (GPUs) dedicated to performing calculations, and/or other processing devices. The memory device 12 can include one or more computer-readable media and can store information accessible by the control circuitry 11, including instructions/programs that can be executed by the control circuitry 12.

The instructions which may be executed by the control circuitry 11 may comprise instructions for implementing the method 100 according to any aspects of the present disclosure. Accordingly, the control circuitry 11 may be configured to perform any of the steps as disclosed in the present disclosure such as the steps in the method 100.

The electronic device 10 may be configured to exchange data with one or more other electronic devices, or a remote entity or a cloud computing device over a network (not shown). Any number of electronic devices 10 may communicate over a network.

The network may be any type of communication network, such as a local area network (e.g. intranet), wide area network (e.g. Internet), cellular network, or some combination thereof. Communication between the electronic devices, clouds and remote entities can be carried via network interface using any type of wired and/or wireless connection, using a variety of communication protocols (e.g. TCP/IP, HTTP, SMTP, FTP), encodings or formats (e.g. HTMF, XMF), and/or protection schemes (e.g. VPN, secure HTTP, SSF).

Figure 7:
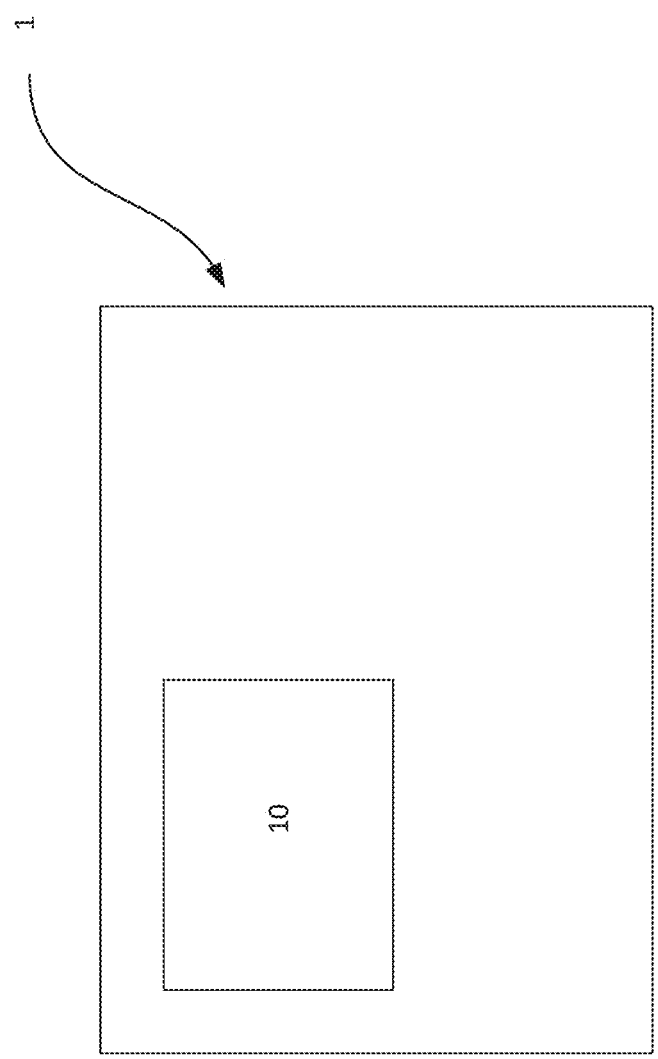
FIG. 7 schematically illustrates a vehicle comprising an electronic device for tracking objects in accordance with an embodiment of the present disclosure.

FIG. 7 illustrates a vehicle 1 comprising the electronic device 10 in accordance with an embodiment of the present disclosure.

Figure 8:
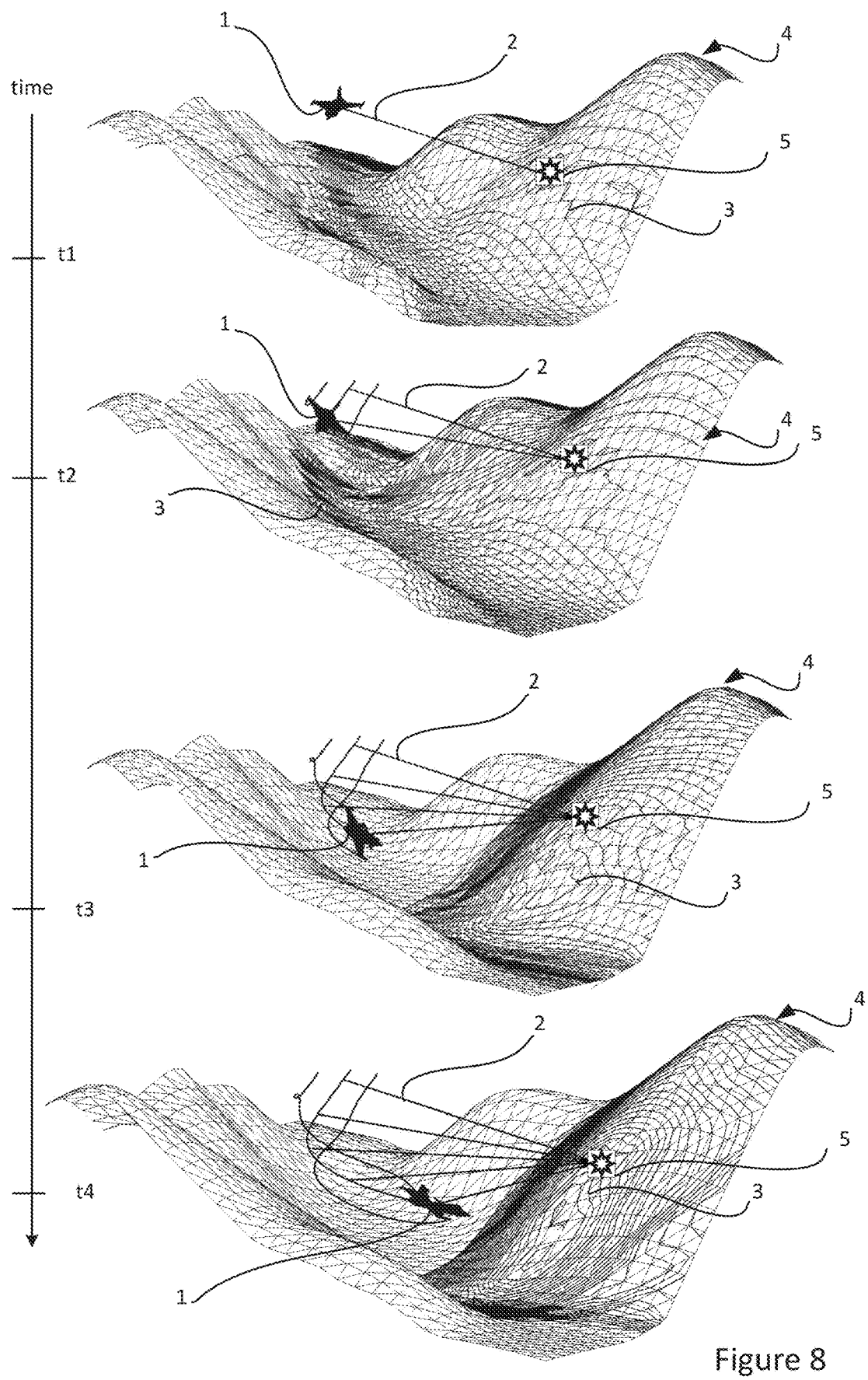
FIG. 8 illustrates an exemplary view of a state space of interest over a time period t1-t4, representing a state-space distribution for a tracked object.

FIG. 8 illustrates a vehicle 1 performing object tracking in accordance with the present disclosure over a sequence of discrete time points $\{t_1, \ldots, t_4\}$, illustrating how the probability density is shifted upon obtaining additional evidence and propagating the state-space distribution. FIG. 8 illustrates object tracking in an exemplary manner of the present disclosure and the disclosure is not limited to such a form.

Figure 9:
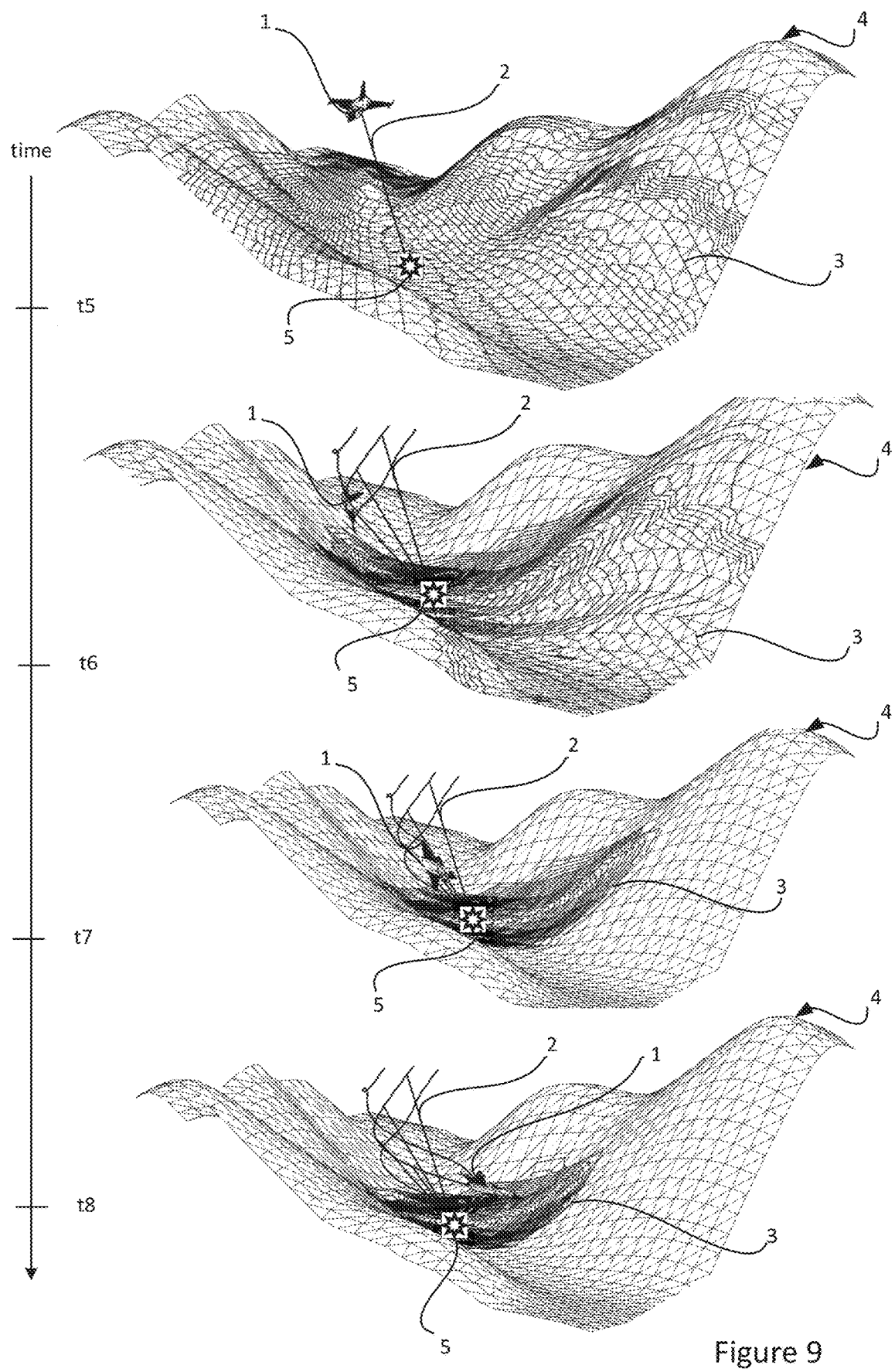
FIG. 9 illustrates an exemplary view of a state space of interest over a time period t4-t8 representing a state-space distribution for a tracked object.

As shown in FIG. 8, the probability density defined by the density lines 3 densifies around the true object position 5 the more evidence 2 that is obtained by the vehicle 1 (or electronic device in the vehicle). The vehicle 1 in FIG. 9 is moving over a state-space of interest 4 subject to tracking. Thus, at $t_4$, the probability density is shifted compared to $t_1$, thus allowing the vehicle 1 to determine the object position 5 in a more accurate manner. This is achieved by updating the state-space distribution based on obtained evidence 2 and propagating by utilizing the FEM representation in accordance with the present disclosure.

FIG. 9 illustrates a further vehicle 1 performing object tracking in accordance with the present disclosure over a time period shown in four parts ($t_4$-$t_8$). $t_4$-$t_8$ may be an alternative time period or a later time period relative $t_1$-$t_4$. Thus, the tracked object may be an additional object tracked simultaneously while tracking the object in FIG. 8. The vehicle 1 in FIG. 9 is moving over a state-space of interest 4 subject to tracking. In FIG. 9, the probability density defined by the probability lines 3 is also less dense in $t_1$ compared to in $t_4$ where there is obtained more evidence 2 showing that in $t_8$, the probability density is shifted and the true object position 5 may me more accurately determined compared to $t_4$.

The invention claimed is:

1. A method for object tracking, the method comprising:
   defining, by an electronic device, a state-space of interest based on a class of objects subject to tracking;
   representing, by the electronic device, the state-space of interest using a finite element model (FEM) representation partitioning the state-space of interest in elements, wherein FEM is a numerical model representing said state-space partitioned into elements where basis functions are associated to the partitioning;
   initiating, by the electronic device, a state-space distribution defining a probability density for different states of at least one tracked object in the state-space of interest;
   updating, by the electronic device, the state-space distribution based on evidence, wherein the evidence being at least one of sensor data and external data of at least one tracked object in said class of objects;
   propagating, by the electronic device, the state-space distribution of the at least one tracked object for a time period; and
   autonomously prioritizing a state-space resolution of the state-space distribution, wherein prioritizing comprises increasing the resolution for the at least one tracked object in order to emphasize said at least one tracked object in said state-space distribution and lower resolution in domains of said state-space of interest having low priority.

2. The method according to claim 1, wherein the method further comprises the step of:
   re-building the FEM representation, wherein the re-built FEM-representation adjusts a state-space resolution of said state-space of interest for each of the at least one objects.

3. The method according to claim 1, wherein the states are at least one of the position of the at least one object, the velocity of the at least one object, or the position and the velocity of the at least one object.

4. The method according to claim 1, wherein the state-space of interest represents all possible states of the at least one tracked object.

5. The method according to claim 1, further comprising the step of:
   prioritizing a state-space resolution of the state-space distribution, wherein prioritizing comprises modifying the resolution for at least one of:
   a part of said state-space of interest; or
   a selection of the at least one tracked objects.

6. The method according to claim 1, further comprising the step of:
   transmitting the state-space distribution to a remote entity.

7. The method according to claim 1, wherein the class of objects is classified based on a mobility of objects.

8. The method according to claim 1, wherein the step of propagating comprises time-integrating states of the at least one object in said state-space of interest for a time period.

9. An electronic device for object tracking comprising control circuitry, a memory device, an input interface, at least one output interface, wherein the control circuitry is configured to execute instruction sets stored in the memory device to:
   define a state-space of interest based on a class of objects subject to tracking;
   representing the state-space of interest using a finite element model (FEM) representation partitioning the state-space of interest in elements, wherein FEM is a numerical model representing said state-space partitioned into elements where basis functions are associated to the partitioning;
   initiate a state-space distribution defining a probability density for different states of at least one tracked object in the state-space of interest;
   update the state-space distribution based on evidence, wherein the evidence being at least one of sensor data and external data of at least one tracked object in said class of objects;
   propagate the state-space distribution of the at least one tracked object for a time period; and
   autonomously prioritize a state-space resolution of the state-space distribution, wherein prioritize comprises increasing the resolution for the at least one tracked object in order to emphasize said at least one tracked object in said state-space distribution and lower resolution in domains of said state-space of interest having low priority.

10. A non-transitory computer readable storage medium storing one or more programs configured to be executed by one or more control circuitry of an electronic device, the one or more programs comprising instructions for performing the method according to claim 1.

11. A vehicle comprising the electronic device according to claim 9.

* * * * *